United States Patent [19]

Suzuki

[11] Patent Number: 5,432,578
[45] Date of Patent: Jul. 11, 1995

[54] ILLUMINATING DEVICE FOR A CAMERA
[75] Inventor: Shinichi Suzuki, Tokyo, Japan
[73] Assignee: Nikon Corporation, Tokyo, Japan
[21] Appl. No.: 97,897
[22] Filed: Jul. 28, 1993
[30] Foreign Application Priority Data
Aug. 19, 1992 [JP] Japan .................................. 4-220453
[51] Int. Cl.6 ............................................. G03B 17/00
[52] U.S. Cl. ............................... 354/289.12; 354/127.1
[58] Field of Search ................. 354/289.12, 127.1, 136, 354/137, 138, 147

[56] References Cited
U.S. PATENT DOCUMENTS
4,085,413 4/1978 Karikawa ............................. 354/137

Primary Examiner—Monroe H. Hayes
Attorney, Agent, or Firm—Oliff & Berridge

[57] ABSTRACT

A camera protects against wasting battery power by turning off an illuminating device when a photographer is engaged in an photographic operation. The illuminating device includes a back light which illuminates a displace device for display of information related to photography and a release actuation member which generates a half press signal and a full press signal, respectively, upon a first and a second stroke. The back light is turned on according to a "turn on" signal, while the back light is turned off according to the half press signal. The back light is also turned on when the photometric value of a photometric circuit is above a predetermined value.

12 Claims, 5 Drawing Sheets

ILLUMINATING DEVICE FOR A CAMERA

BACKGROUND OF THE INVENTION

1. Field of the Invention

The present invention relates to an illuminating device which is fitted to a display unit of a camera.

2. Related Background Art

As prior art illuminating devices of this type, there are known, for example, a conventional illuminating device (Background Art 1) which is turned on and turned off in unison with the actuation of a turn on switch, and a conventional illuminating device (Background Art 2) which is turned on by the actuation of a turn on switch or the like and which remains on for just a predetermined time period thereafter.

However, with the above described Background Art 2, since the illuminating device continues to be turned on for the predetermined time period after the turn on switch has been actuated, therefore the display unit is turned on even after it has become no longer necessary for the photographer to look at the display unit to check the information displayed on the display unit. Due to this problems arise in that the battery is discharged uselessly and the lifetime of the illuminating element is shortened.

Further, with Background Art 2, since the illuminating device is not turned on if the operator does not perform any actuation, therefore performing turning on actuation becomes annoying, and also finding the turn on switch in a dark place by fumbling is difficult.

SUMMARY OF THE INVENTION

An object of the present invention is to turn off the illuminating device when the photographer proceeds to photographic operation, thus preventing discharge of the battery.

Another object of the present invention is to turn on the illuminating device automatically according to the illumination in the place of photography.

In order to attain the above described objects, the illuminating device for a camera according to the present invention having an illuminating means which illuminates a display means which displays information related to photography, and a release actuation means which is operated for commanding preparation for photography or photographic operation and outputs a command signal, comprises a control means which turns on the illuminating means according to a turn on signal, and turns off the illuminating means according to the command signal.

Further, the illuminating device for a camera according to the present invention having an illuminating means which illuminates a display means which displays information related to photography and a photometric means which measures the luminance of a photographic subject, comprises a control means which turns on the illuminating means when the luminance measured by the photometric means is less than a predetermined value.

According to the present invention, since the construction is such that the illuminating device is turned off when the release actuation means is operated while the illuminating device is turned on, thereby the battery is not uselessly discharged, and further it is possible to extend the lifetime of the illuminating means. Further, since the construction is such that the illuminating device is turned on when the luminance of the photographic subject is darker than a predetermined luminance, thereby it is possible to eliminate the pressing procedure for an individual illumination switch by the photographer, and photographer can concentrate on photographing.

DESCRIPTION OF THE PREFERRED EMBODIMENTS

The first embodiment of the present invention will be described with reference to FIGS. 1 through 5.

Figure 1:
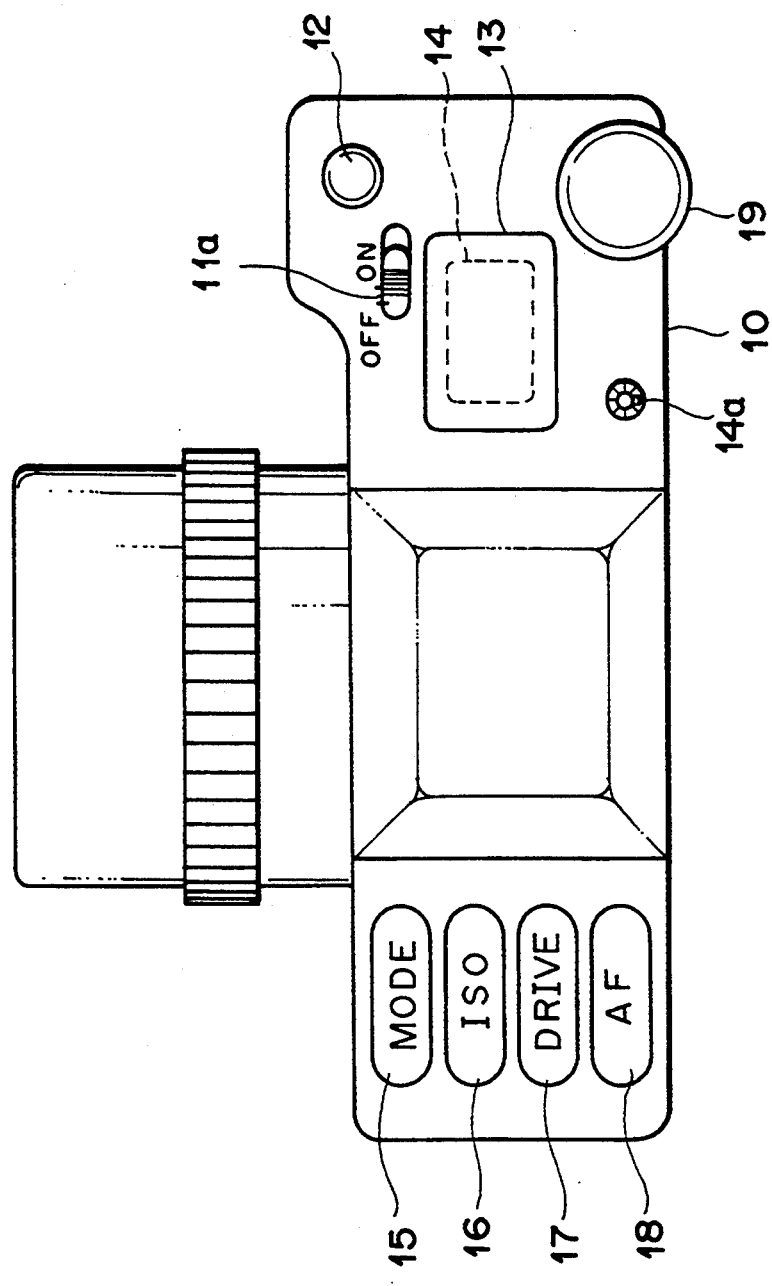
FIG. 1 is a view as seen from above of a camera suitable for application of the first embodiment of the present invention.
Figure 2:
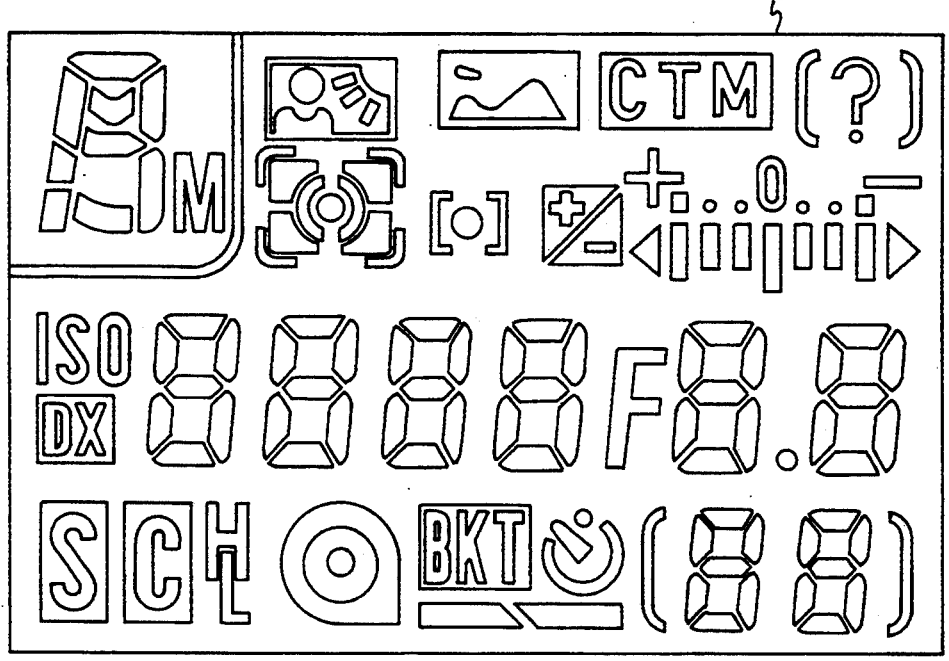
FIG. 2 is a view showing as a whole the information displayed by a display device according to the first embodiment of the present invention.

FIG. 1 is a view as seen from above of a camera 10 suitable for application of the first embodiment of the present invention. Upon a actuating a main switch, 11a to the on position electrical energy is supplied to the various parts of the camera 10. A per se known release button 12 and a display device 13 which displays various information related to photography are also shown. This display device 13 may be realized, for example, as a liquid crystal display device. The display device 13 comprises an illuminating device 14 which is turned on after the actuation of a turn on actuation button 14a for just a predetermined time period. FIG. 2 shows as a whole the various information displayed by the display device 13. The display device 13 and an illuminating device 14 will be described in detail hereinafter.

A mode selection switch 15 is actuated for selecting various photographic modes, and as the mode selection switch 15 is actuated various selection modes are selected such as a photometric method selection mode, an exposure control selection mode, and the like. A film sensitivity setting mode selection switch 16 selects whether the setting of film sensitivity is to be performed automatically or manually. A film forwarding mode selection switch 17 selects whether each time the release button 12 is actuated once the film will be exposed for one frame, or whether during the time interval that the release button 12 is held down a plurality of film frames will be photographed. An AF selection switch 18 which selects, for example, whether a focus adjustment operation will be performed according to a signal from an AF (focus detection) area defined at the central portion of the photographic field, or whether a focus adjustment operation will be performed according to signals from a plurality of AF areas. A is a mode selection dial 19 outputs a signal according to the amount and direction by which it has been rotationally actuated, and, after the desired mode has been set on the switches 15 through 18, the desired mode or ISO value or the like from within each mode is then again selected by the use of the dial 19.

Figure 3:
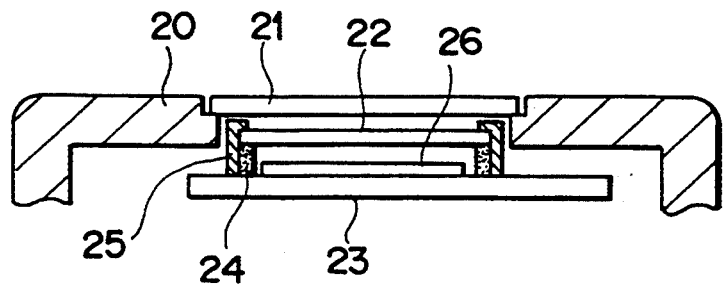
FIG. 3 is a cross sectional view showing the display device according to the first embodiment of the present invention.

FIG. 3 is a cross sectional view of the display device 13. A display window member 21 is set into an upper surface window portion of the main body 20 of the camera, and under this a liquid crystal display panel element 22 is provided. This liquid crystal display panel element 22 is provided above a printed circuit board element 23—in more detail, is held between a housing member 25 and the printed circuit board element 23 via an electroconductive rubber member 24. A back light 26, which functions as an illuminating element, is disposed within the space between the printed circuit board element 23 and the liquid crystal display panel element 22, and, in this embodiment, is provided on the upper surface of the printed circuit board element 23. This back light 26 illuminates the liquid crystal display panel element 22 from its rear surface. An electroluminescent element (EL element) can be used as the back light 26. The position of the back light 26 relative to the housing 25 can be fixed easily.

Figure 4:
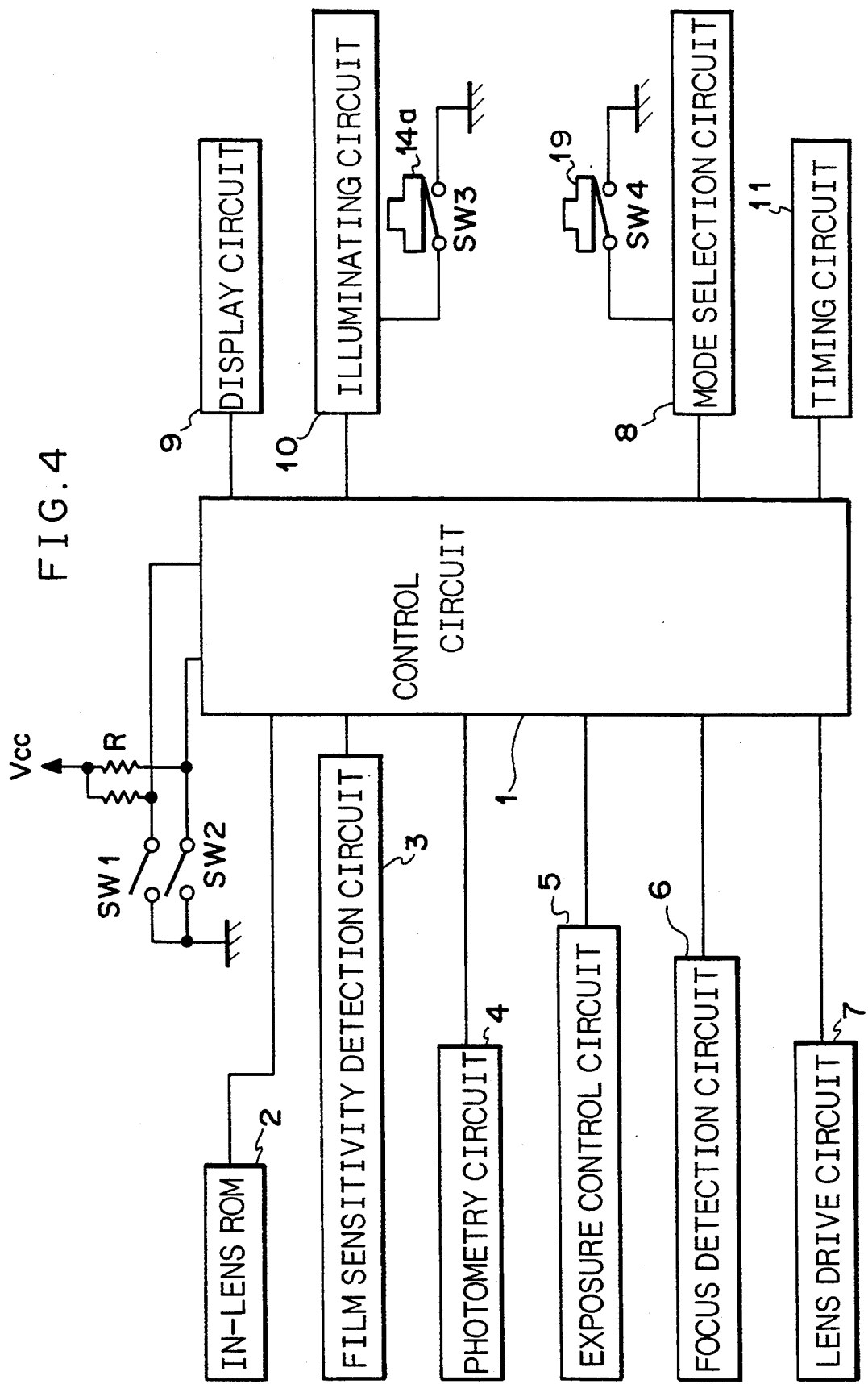
FIG. 4 is a block diagram showing the camera suitable for application of the first embodiment of the present invention.

FIG. 4 is a block diagram of the camera. In this embodiment, various functions which will be described hereinafter are controlled by a control circuit 1 which comprises a CPU and the like. A lens ROM 2 outputs the F-number, the focal length, the exit pupil, etc. of the lens which is fitted. A film sensitivity detection circuit 3 outputs the film sensitivity etc. A photometric circuit 4 determines and outputs the luminance of the photographic subject. An exposure control circuit 5 calculates the exposure value from the data from the photometric circuit 4, and based upon the exposure value controls a shutter and a diaphragm not shown in the figures. A focus detection circuit 6 detects the focus, and outputs a focus detection signal corresponding to the result thereof. A lens drive circuit 7 drives the lens based upon the output focus detection signal output from the focus detection circuit 6, and performs focus adjustment operation. A mode selection circuit 8 is operated according to the actuation of the various switches 15 through 18 described above, and comprises a photometric method selection circuit, an exposure control mode selection circuit, a film forwarding method selection circuit, a film sensitivity detection selection circuit, an AF area selection circuit, and the like. To the mode selection circuit 8 there is connected a switch SW4 which is turned on in unison with the rotational actuation of the dial 19. A display circuit, and includes the above described display device 13 which displays the modes decided upon by the mode selection circuit 8 and other information related to photography, and its drive circuitry. An illuminating circuit, 10 includes the back light 26 contained within the display device 13 and its drive circuitry.

In FIG. 4, SW1 is a half press switch which is turned on when the release button 12 is half pressed (through a first stroke), and SW2 is a full press switch which is turned on when the release button 12 is fully pressed (through a second stroke). A half press signal is output by turning on the switch SW1 and photographic preparation operations such as photometry and distance measurement and the like are commanded by this half press signal. A full press signal is output by turning on the switch SW2, and photographic operations such as aperture setting and shutter movement the like are commanded by this full press signal. A switch SW3, which is connected to the illuminating circuit 10, is a turn on switch which outputs a turn on signal when an operator performs "on" actuation of a turn on actuation button 14a. According to the on actuation of the turn on switch SW3, the turn on signal is input to the illumination circuit 10, and the back light 26 is turned on. A timing circuit 11 starts a timer when the turn on switch SW3 is actuated to on, and performs time measurement, and when a predetermined time period has elapsed outputs a turn off signal to the illuminating circuit 10, so as to turn off the back light 26.

Figure 5:
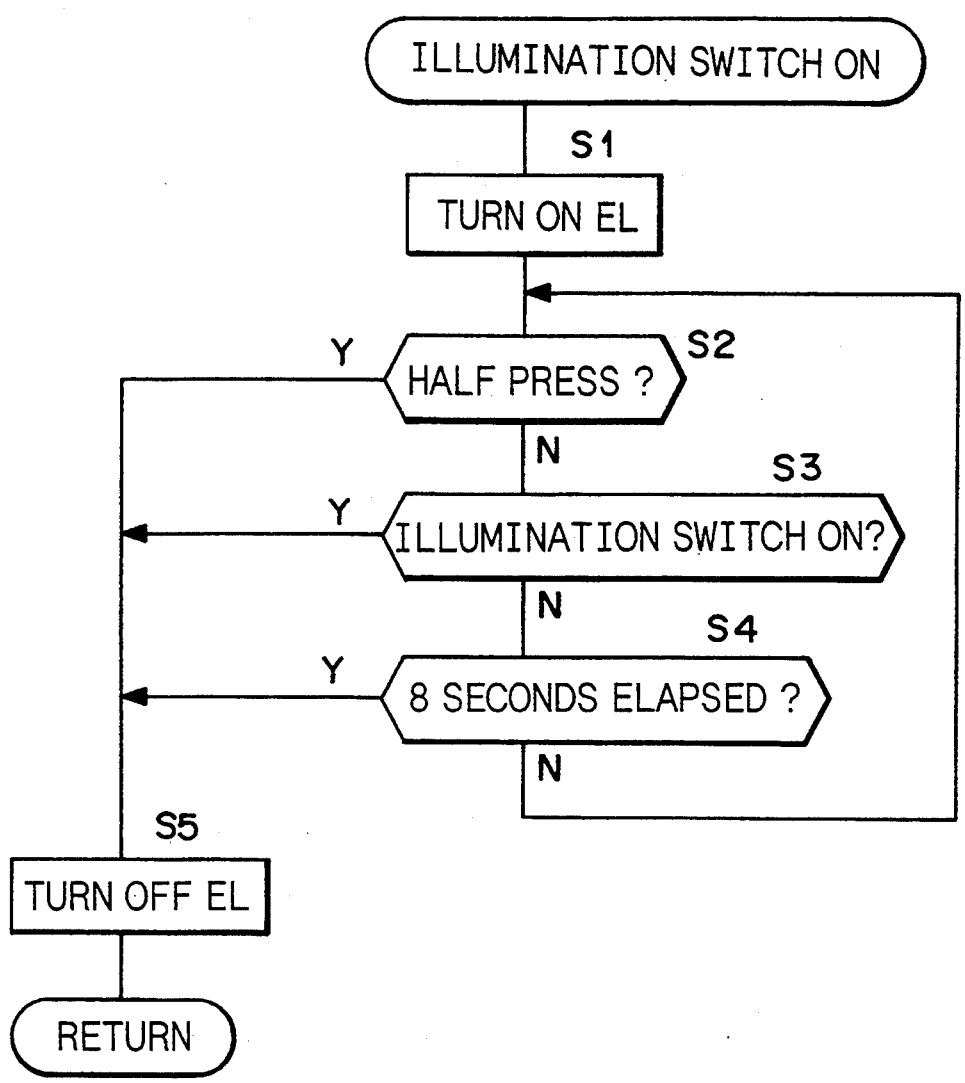
FIG. 5 is a flow chart showing the processing procedure of the first embodiment of the present invention.

FIG. 5 is a flow chart for the control device 1 for turning on and turning off the back light 26 via the illuminating circuit 10. The program shown in the FIG. 5 flow chart is started when the turn on switch SW3 is actuated to on and a turn on signal is output. In step S1 the back light 26 is turned on. After this, in step S2 a decision is made as to whether the half press switch SW1 is on, and if decision is YES then in the step S5 a turn off signal is output and the back light 26 is turned off. If in step S2 it has been decided that the half press switch SW1 is on, it is deemed that the photographer is already looking through the viewfinder at the photographic subject. Accordingly, since it is not necessary to illuminate the liquid crystal display device 13, the back up light 26 is turned off, from the point of view of energy conservation and of durability of the back light 26.

If in step S2 the decision is NO, then control proceeds to step S3, and a decision is made as to whether the turn on switch SW3 is being actuated a second time, and if the decision is YES then in the step S5 back light 26 is turned off. If in step S3 the decision is NO, then control proceeds to the step S4, and a decision is made from the time measurement contents of the timer of the timing circuit 11 as to whether or not eight seconds have elapsed from when the turn on switch SW3 was actuated to on, and if the decision is YES then in the step S5 back light 26 is turned off.

With this embodiment as described above, since the construction is such that, after the back light 26 has been turned on by the turn on switch SW3 being actuated to on, the back light 26 is turned off when before the predetermined time period has elapsed half press actuation is performed, thereby useless illumination is prevented. Now, the function of turning off the back light after the predetermined time period has elapsed is not indispensable for the present invention, and it is also beneficial to add the function of the present invention for turning off on the actuation of the release button to a device constructed so as normally to turn the back light on and off according to the on and off actuation of the turn on switch SW3.

Figure 6:
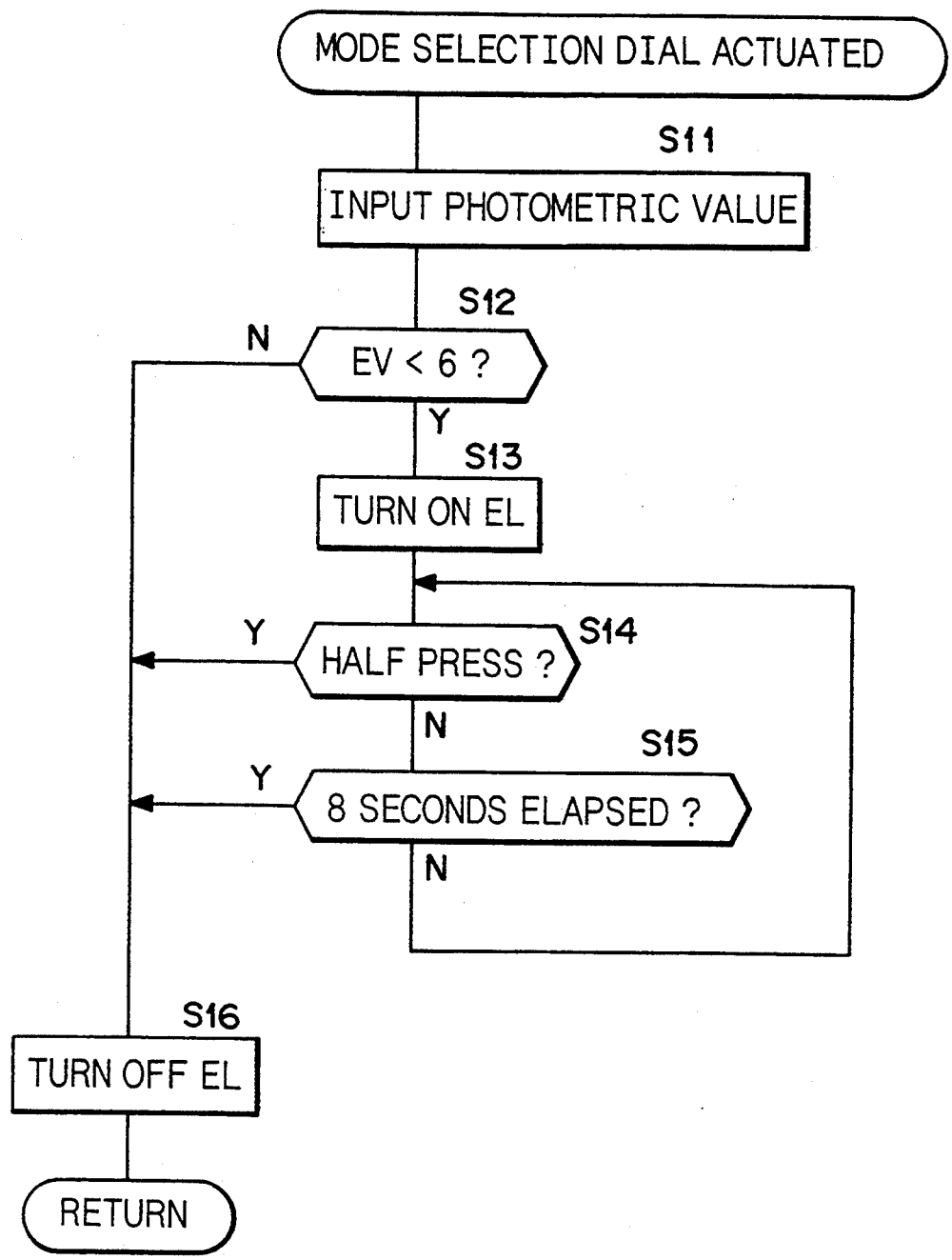
FIG. 6 is a flow chart showing the processing procedure of the second embodiment of the present invention.

FIG. 6 is a flow chart showing a second embodiment of the present invention. In this embodiment, the back light 26 is turned on automatically according to the luminance of the photographic subject.

The program shown in the FIG. 5 flow chart is started when the switch SW4 is turned on in unison with the rotation of the dial 19, i.e. when an attempt is made to change one of the modes of the mode selection circuit 8.

In step S11, the photometric value from the photometric circuit 4 is read in. In step S12, a decision is made as to whether or not the luminance according to (for example) the APEX (Additive System of Photographic Exposure) method for ISO100 is less than EV6, and if the decision is YES then control proceeds to the step S13, in which a turn on signal is output and the back light 26 is turned on. If the decision in step S12 is NO, then the turned off condition is continued as it is. In step S14, a decision is made as to whether the half press switch SW1 is on, and if the decision is NO then control proceeds to step S15. If the decision is YES then in step S16 the back light 26 is turned off. In step S15 a decision is made as to whether eight seconds have elapsed from when the dial switch SW4 was actuated to on, and if the decision is NO then control returns to step S14, while if the decision is YES then control proceeds to step S16 and the back light 26 is turned off.

In this embodiment, when the luminance of the photographic subject is dark, the back light 26 is turned on when the mode dial 19 is actuated in order to change the photographic mode, and it is possible to turn on the back light 26 even if the photographer does nothing, so that he is liberated from the troublesome turning on actuation. Now although, in the same way with this second embodiment as with the previous first embodiment, even before the predetermined time period has elapsed the back up light is turned off with half press actuation, along with turning off the back light when a predetermined time period elapses, these functions are not essential for the device of the present invention which is turning on the illuminating device for the display device when the surroundings are dark. Accordingly, in the same manner as explained with regard to the first embodiment, it is also beneficial to add the function of the present invention for automatically turning on when the surroundings are dark to a device constructed so as to turn on and off according to the on and off actuation of the turn on switch SW3.

Although the description in the above was in terms of the case of turning on and turning off an illuminating device for a display device 13 which was provided on the upper surface of the camera 10, the present invention is not limited to this, and can also be applied to turning on and turning off control of an illuminating device for a display device which is provided elsewhere than on the upper surface of a camera. Further, the display element is not limited to being a liquid crystal element, and the illuminating device is also not restricted to being an EL element, and it is also included to illuminate a display device by a side light, or in the extreme case by an illumination lamp provided elsewhere than in the upper surface of the camera. Of course it is also acceptable to use illumination other than an EL element. Yet further, although it was decided that the surroundings were dark according to photometric output, it would also be acceptable to measure the darkness by a luminance sensor that was provided separately. And, further, although the construction was such that the illuminating device was turned off upon the half press actuation of the release button, it would also be acceptable to turn off upon the full press operation.

I claim:

1. An illuminating device for a camera having an illuminating element which illuminates a display device which displays information related to photography and a release actuation device which is operated for commanding both preparation for photography and a photographic operation respectively and which outputs first and second command signals respectively, comprising:
a signal output device which outputs a turn on signal,
a control circuit which turns on said illuminating element according to said turn on signal and turns off said illuminating element according to either said first command signal or said second command signal.

2. An illuminating device according to claim 1, wherein:
said release actuation device upon a first stroke outputs said first command signal to begin preparation for photography and upon a second stroke exceeding said first stroke outputs said second command signal to begin photographic operation,
said control circuit turns off said illuminating element, based upon said first command signal from said release actuation device.

3. An illuminating device according to claim 2, further comprising:
a timing circuit which outputs a third command signal after a predetermined time period has elapsed from the turning on of said illuminating element,
wherein said control circuit turns off said illuminating element according to the earlier one of said third command signal and the first command signal input to said control circuit from said timing circuit and from said release actuation device.

4. An illuminating device according to claim 1, wherein:
said release actuation device upon a first stroke outputs said first command signal to begin preparation for photography and upon a second stroke exceeding said first stroke outputs said second command signal to begin photographic operation,
said control circuit turns off said illuminating element, based upon said second command signal from said release actuation device.

5. An illuminating device according to claim 1, further comprising:
a photometric device which measures luminance of a photographic subject,
said signal output device outputting said turn on signal when the luminance measured by said photometric device is less than a predetermined value.

6. An illuminating device according to claim 5, further comprising a mode actuation device which is operated for setting a mode related to photography and outputs a mode command signal according to the mode setting,
said photometric device being started when said mode command signal is output from said mode actuation device.

7. An illuminating device according to claim 6, further comprising a turn on actuation member which is operated to output said turn on signal.

8. An illuminating device according to claim 1, wherein said illuminating element comprises an electroluminescent element.

9. An illuminating device according to claim 1, further comprising a timing circuit which outputs a third command signal after a predetermined time period has elapsed from the turning on of said illuminating element,
wherein said control circuit turns off said illuminating element according to the earlier one of said first, second and third command signals input to said control circuit from said timing circuit and from said release actuation device.

10. An illuminating device for a camera having an illuminating element which illuminates a display device which displays information related to photography, a release actuation device which upon a first stroke outputs a half press signal to begin preparation for photography and upon a second stroke exceeding said first stroke outputs a full press signal to begin a photographic operation, and a mode actuation device which is operated for setting a mode related to photography and outputs a mode command signal according to the mode setting, comprising:

- a photometric device the operation of which is started when said mode command signal is output from said mode actuation device and which measures the luminance of a photographic subject;
- a signal output circuit which outputs a turn on signal when the luminance measured by said photometric device is less than a predetermined value;
- a timing circuit which outputs a turn-off command signal after a predetermined time period has elapsed from the turning on of said illuminating element; and
- a control circuit which turns on said illuminating element according to said turn on signal, and turns off said illuminating element according to the earlier one of said turn-off command signal and the half press signal input to said control circuit from said timing circuit and from said release actuation device.

11. An illuminating device for a camera having an illuminating element which illuminates a display device which displays information related to photography, a release actuation device which upon a first stroke outputs a half press signal to begin preparation for photography and upon a second stroke exceeding said first stroke outputs a full press signal to begin a photographic operation, and a mode actuation device which is operated for setting a mode related to photography and outputs a mode command signal according to the mode setting, comprising:

- a photometric device the operation of which is started when said mode command signal is output from said mode actuation device and which measures the luminance of a photographic subject;
- a signal output circuit which outputs a turn on signal when the luminance measured by said photometric device is less than a predetermined value;
- a timing circuit which outputs a turn-off command signal after a predetermined time period has elapsed from the turning on of said illuminating element; and
- a control circuit which turns on said illuminating element according to said turn on signal, and turns off said illuminating element to conserve power according to the earlier one of said turn-off command signal and the half press signal input to said control circuit from said timing circuit and from said release actuation device; and
- a turn on actuation member which is operated to output said turn on signal.

12. An illuminating device according to claim 1 wherein said illuminating element comprises an electroluminescent element.

* * * * *